US 7,045,166 B2

(12) United States Patent
Silver

(10) Patent No.: US 7,045,166 B2
(45) Date of Patent: *May 16, 2006

(54) SWEETENER COMPOSITIONS CONTAINING FRACTIONS OF INULIN

(76) Inventor: Barnard S. Silver, 4390 S. 2300 East, Holladay, UT (US) 84124-3651

( * ) Notice: Subject to any disclaimer, the term of this patent is extended or adjusted under 35 U.S.C. 154(b) by 389 days.

This patent is subject to a terminal disclaimer.

(21) Appl. No.: 10/443,935

(22) Filed: May 22, 2003

(65) Prior Publication Data
US 2003/0207003 A1 Nov. 6, 2003

Related U.S. Application Data

(63) Continuation-in-part of application No. 10/037,027, filed on Nov. 9, 2001, now Pat. No. 6,569,488, which is a continuation-in-part of application No. 09/716,780, filed on Nov. 20, 2000, now Pat. No. 6,419,978, which is a continuation-in-part of application No. 09/553,973, filed on Apr. 20, 2000, now abandoned, which is a continuation-in-part of application No. 09/379,952, filed on Aug. 24, 1999, now Pat. No. 6,399,142.

(60) Provisional application No. 60/098,195, filed on Aug. 27, 1998, and provisional application No. 60/104,091, filed on Oct. 13, 1998.

(51) Int. Cl.
A23G 3/00 (2006.01)

(52) U.S. Cl. .................. 426/658; 426/548; 536/128
(58) Field of Classification Search ............. 426/548, 426/658; 536/124, 128
See application file for complete search history.

(56) References Cited

U.S. PATENT DOCUMENTS

| 4,285,735 A | 8/1981 | Mitchell et al. |
| 4,304,768 A | 12/1981 | Staub et al. |
| 4,421,852 A | 12/1983 | Hoehn et al. |
| 4,758,515 A | 7/1988 | Barwald et al. |
| 4,954,622 A | 9/1990 | Cooper |
| 5,051,408 A | 9/1991 | Cooper |
| 5,319,048 A | 6/1994 | Carosino et al. |
| 5,366,962 A | 11/1994 | Biton et al. |
| 5,422,346 A | 6/1995 | Mitchell et al. |
| 5,456,893 A | 10/1995 | Silver |
| 5,476,844 A | 12/1995 | Cooper |
| 5,502,180 A | 3/1996 | Kunz et al. |
| 5,527,556 A | 6/1996 | Frippiat et al. |
| 5,547,697 A | 8/1996 | Lipsch et al. |
| 5,561,226 A | 10/1996 | Nitsch |
| 5,659,028 A | 8/1997 | Coussement et al. |
| 5,660,872 A | 8/1997 | Van Loo et al. |
| 5,721,004 A | 2/1998 | James |
| 5,827,526 A | 10/1998 | Dohnalek et al. |
| 5,840,361 A | 11/1998 | Theuer et al. |
| 5,882,709 A | 3/1999 | Zumbe |
| 5,968,365 A | 10/1999 | Laurenzo et al. |
| 5,989,619 A | 11/1999 | Zumbe et al. |
| 6,399,142 B1 * | 6/2002 | Silver .................. 426/658 |
| 6,423,358 B1 | 7/2002 | Barndt et al. |
| 6,569,488 B1 * | 5/2003 | Silver .................. 426/658 |
| 6,808,733 B1 | 10/2004 | Navia et al. ............ 426/548 |
| 2003/0077369 A1 * | 4/2003 | Jager et al. ............ 426/548 |

FOREIGN PATENT DOCUMENTS

| DE | 40 03 140 A1 | 8/1991 |
| EP | 0 861 852 | 2/1997 |
| JP | 03281601 | 12/1991 |
| WO | WO 87/02679 | 5/1987 |
| WO | WO 91/18000 | 11/1991 |
| WO | WO 93/02566 | 2/1993 |
| WO | WO 98/38223 | 9/1998 |
| WO | WO 98/42206 | 10/1998 |

OTHER PUBLICATIONS

Brochure entitled "Innovative with Raftiline," Mar. 1998.
Peldyak, John, DMD, "Xylitol: Sweeten Your Smile," 1996, pp. 2–52.
R.J. Thomann et al., "Recent Investigation on the Fractionation and Use of Products from Jerusalem Artichoke", A. Fuchs Editor, Proceedings of the Fifth Seminar on Inulin, Oct. 27, 1995, pp. 65–66.
Thon, M., AN 359264 FROSTI, "Inulin—Dietary Fibre From Chicory", abstracting Food Tech Europe, 1994, 1(4), 62 +64; 1994.
E. Berghofer, A. Cramer, U. Schmidt and M. Veigl, "Pilot–Scale Production of Inulin from Chicory Roots and Its Use in Foodstuffs," institute of Food Technology, University of Agriculture, Peter–Jordanstraβe 82, 1190, Vienna, Austria, 1993.
Manfred Vogel, "A Process for the Production of Inulin and its Hydrolysis Products from Plant Material," Südzucker AG Mannheim/Ochsenfurt/Zentrallabor, 6718 Grünstadt, Germany, 1993.
K. Vukov, M. Erdélyi and E. Pichler–Magyar, "Preparation of Pure Inulin and Various Inulin–Containing Products from Jerusalem Artichoke for Human Consumption and for Diagnostic Use," University of Horticulture and Food Industry, Budapest, Hungary, 1993.
Teeuwen et al., "Inulin—A Versatile Fibre Ingredient", International Food Ingredients, 1992, No. 5, 10–14; 1992.
W. Praznik et al., "Application of Gel Permeation Chromatographic Systems to the Determination of the Molecular Weight of Inulin", Journal of Chromatography 348 (1985) pp. 187–197.

(Continued)

Primary Examiner—Leslie Wong
(74) Attorney, Agent, or Firm—Brinks Hofer Gilson & Lione

(57) ABSTRACT

Sweetener compositions containing granulated artificial and/or intense sweeteners, and water-soluble/water miscible fractions of inulin. The water soluble/water miscible fractions of inulin comprise polysaccharides in which at least 5 grams of said fractions are soluble in 100 ml. of water at temperatures of about 25° C., and below.

22 Claims, 2 Drawing Sheets

OTHER PUBLICATIONS

The Merck Index, 1976, Ninth Edition, Merck & Co, Inc., Rahway, N.J., p. 660/4863.

R.H. Perry et al., "Crystallization", Chemical Engineers' Handbook, $5^{th}$ Ed., 17–8 to 17–18 (1973).

Birch, et al., "The Composition and Properties of Diabetic Jams", Confectionary Production 1973, 39 (2), 73–76; 1973.

E. J. McDonald, "The Polyfructosans and Difructose Anhydrides", Adv. Carbohydrate Chemistry, 2, pp. 253–277 (1946).

E. Yanovsky et al., "Solubility of Inulin", J. Amer. Chem. Soc. 55, 365888–3663 (1933).

"NPT–17 New High Performance Inulin", 1998 IFT Annual Meeting Technical Program Abstracts p. 63.

Database WPI/Derwent; Derwent Publications Ltd., London, BG; AN76–66213X; XP002058197.

\* cited by examiner

SWEETENER COMPOSITIONS CONTAINING FRACTIONS OF INULIN

RELATED APPLICATIONS

This application is a continuation-in-part of application Ser. No. 10/037,027, filed Nov. 9, 2001 now U.S. Pat. No. 6,569,488, which is a continuation-in-part of Ser. No. 09/716,780 filed Nov. 20, 2000, now U.S. Pat. No. 6,419,978, which is a continuation-in-part of Ser. No. 09/553,973, filed Apr. 20, 2000 now abandoned, which is a continuation-in-part of application Ser. No. 09/379,952, filed Aug. 24, 1999, now U.S. Pat. No. 6,399,142, the latter of which claims priority to U.S. provisional applications Ser. No. 60/098,195 filed Aug. 27, 1998, and Ser. No. 60/104,091, filed Oct. 13, 1998. The foregoing application and patents are incorporated herein by reference thereto.

FIELD OF THE INVENTION

This invention relates to sweetener compositions containing water soluble and/or water miscible fractions of inulin.

BACKGROUND

Inulin, which has been extracted from plants for nearly 100 years with difficulty, belongs to the polysaccharide family of compounds. Inulin is composed of a mixture of polysaccharides having various molecular weights or degrees of polymerization (DP). In general, inulin consists of fructose units with β 1–2 bonds and ending in a glucose unit. The addition or subtraction of fructose units affects inulin's molecular weight or degree of polymerization (DP). Typical inulin properties are set forth in Table 1 below.

TABLE 1

Typical Inulin Properties

| Properties | Assay |
|---|---|
| Description | After drying a fine white powder |
| Taste | Bland, with slight sweetness |
| Carbohydrate content on dry solids basis (ds) | >99.5% |
| Ash (sulfated) on ds | <0.2% |
| Heavy metals (as Pb) on ds | <0.5 mg/kg |
| Caloric content on ds | 1.5 kcal/g |

Inulin is the main carbohydrate in a variety of plants. Table 2 lists common inulin sources and the inulin concentrations therein.

TABLE 2

Common Sources of Inulin

| Source | Inulin % |
|---|---|
| Agave | 15–20 |
| Artichoke | 2–6 |
| Asparagus Root | 10–15 |
| Banana | 0.3 |
| Chicory Root | 15–20 |
| Dahlia Tuber | 15–20 |
| Dandelion | 15–20 |
| Edible Burdock (root) | 16 |
| Garlic | 15–25 |
| Jerusalem Artichoke | 15–20 |
| Leak | 10–15 |
| Onion | 2–6 |
| Rye | 0.7 |
| Salsify | 15–20 |
| Wheat | 0.4 |
| Yacon | 15–20 |

Chicory continues to be grown extensively throughout Europe, and its many varieties are harvested and processed into an assortment of products from salad greens and cattle feed to fructose and recently to inulin. Because of its ease of cultivation and harvesting, chicory has become the principal source of inulin today.

As inulin comes from the field in the chicory plant, its molecular weight depends on many factors such as time of planting, time of harvest, amount of stress, variety type, amount of time which elapsed between harvest and processing, amount of damage at harvest and other factors.

Today, inulin is approved for use as a food additive by the governments of nine European countries (Belgium, Denmark, France, Luxembourg, Netherlands, Portugal, Spain, Sweden, and Switzerland) and Japan, and its applications are varied.

Despite the approval of inulin as a food additive in many countries, the use of inulin has been limited, because of, among other things, the limited solubility and/or miscibility of inulin in water at ambient temperatures, for example, at temperatures ranging from about 25° C., and below.

One publication reports the solubility in water of inulin derived from chicory roots to be less than about 3% (% weight/volume) at 30° C., and less than about 5% (% weight/volume) at 40° C. See E. Berghofer et al., PILOT-SCALE PRODUCTION OF INULIN FROM CHICORY ROOTS AND ITS USE IN FOODSTUFFS, CROPS, Elsevier Science Publishers, B. V., A. Fuchs, Editor, 1993 (pp. 77–84).

Another publication submitted by the United Stated Department of Agriculture reports the solubility of inulin extracted from chicory roots to be less than 2 grams per 100 cc of water at 20° C. See E. Yanovsky et al., "Solubility of Inulin", CONTRIBUTION NO. 129 FROM THE CARBOHYDRATE DIVISION, BUREAU OF CHEMISTRY AND SOILS, U.S. DEPARTMENT OF AGRICULTURE, J. Amer. Chem. Soc. 55, 3658–3633 (1933). The same publication reports lesser solubilities for inulin extracted from Dahlia.

Caloric concerns have long played a significant role in the food choice of the U.S. public, and low calorie foods have been popular for years. Foods of this category have been dominated by those products where fructose and sucrose have been replaced by an artificial sweetener which can add sweetness without the caloric impact. In particular, the success of artificial sweeteners such as saccharin, aspartame and more recently sucralose, should be noted.

Most artificial or intense sweeteners, such as saccharin and aspartame, have 180 to 300 times the sweetness of an equivalent dose of sucrose. Sucralose is a sweetener 600 times sweeter than sugar. Neotane is an intense sweetener having 8000 times the sweetness of sucrose. Food processors need to use a much lower volume of these artificial sweeteners in their low calorie foods than the volume of sugar which they replace. With dry goods (such as baked products), food processors are forced to "back fill" the volume of the removed sugar which the artificial sweeteners do not replace. This back fill product is referred to as a "bulking agent." Bulking agents are used in a variety of products, including chewing gums, confectioneries, baking mixes, meat products, and packets containing the artificial sweetener in amounts equivalent to one or more teaspoons of sugar. The optimal bulking agents should bring the physical and chemical characteristics of sugar back to the food without adding back calories or contributing significantly to product cost.

Bulking agents are evaluated against the following criteria:
1. Significantly fewer calories than sucrose, glucose or fructose
2. Physical and chemical properties that match those of sucrose in all food applications
3. Mouthfeel comparable to sugar
4. Freedom from adhesion to lips and tongue
5. Freedom from toothpack (freedom from packing into crowns of teeth)
6. Preferrably, demonstrate existence of secondary health benefits
7. No negative side effects and completely safe at reasonable levels of consumption
8. In the dry product, freedom from caking and clumping
9. In the wet product, no settling out or fractionation upon standing More specifically, in order to effectively replace sucrose and fructose and their organoleptic qualities, potential bulking agents should mimic the following characteristics:

| | |
|---|---|
| Safe | Stable |
| Low calorie | Minimal gastrointestinal side effects |
| Low cost | No off-flavors |
| High solubility | Low viscosity |
| Crystalline | Ability to brown |

Protein/starch interactions similar to sucrose

A major obstacle to the use of inulin as a bulking agent in foodstuffs despite its many advantages is its rather low solubility in water at ambient temperatures.

Another major obstacle to the use of inulin as a bulking agent is the presence of various amounts of glucose and fructose, which are naturally contained therein, and which have made inulin difficult to dry and difficult to handle and store. In the drying of inulin, the presence of glucose and fructose, which are hygroscopic, interferes with the drying process, unless there is a large proportion of high molecular weight inulin which dries more readily than the lower molecular weight inulin compounds. Even after drying, the hygroscopicity of glucose and fructose tends to reintroduce moisture into the product.

In the case of granular or dry inulin products, the hygroscopic activity of glucose and fructose tends to cause undesirable caking and clumping. Due to the caking and clumping, the granular or dry inulin products containing glucose and fructose are difficult to handle, store, and blend.

In addition, most inulin products used as bulking agents with artificial sweeteners heretofore have contained significant amounts of free fructose and glucose and also contained high molecular weight inulin compounds, for example, molecular weights above 2288. When such inulin products are taken by mouth, there is a formation of sticky, hard substance in the mouth caused by the insolubility of such high molecular weight inulin in the saliva at body temperatures. This sticky substance may adhere to the lips and tongue, and may pack on the crowns of the consumer's teeth. In some cases, the sticky substance forms a crusty insoluble mass in the mouth which must be chewed in order to break up.

Inulin comprises polysaccharides, fragile polymers, which are difficult to extract by classical prior methods. European Patent 787 745 illustrates one method for extraction of inulin from Jerusalem artichokes using the classical sugarbeet extraction, and then clarifying the inulin rich extraction liquid by ultrafiltration. Silver U.S. Pat. No. 5,456,893 discloses a process and apparatus for extracting inulin in a manner which does not degrade the inulin or allow the inulin to be broken down.

BRIEF SUMMARY

Accordingly, it is an object of the invention to design water soluble, granulated sweetener compositions containing water soluble fractions of inulin.

Other objects of the invention will be apparent from the following description and accompanying drawings.

DETAILED DESCRIPTION OF THE DRAWINGS AND THE PRESENTLY PREFERRED EMBODIMENTS

In accordance with the objects of the invention, it has been discovered that novel fractions of inulin containing at least two, preferably at least three, desirably at least four, different polysaccharides each with differing molecular weights in the range of about 2288 and below, and in which said fractions have less than 25% by weight of polysaccharides with molecular weights above 2288, exhibit improved water solubility and/or water miscibility. Inulin portions having molecular weights in the range from about 340 to about 2288, preferably in the range from about 480 to about 2288, have surprising and unexpected benefits especially when such fractions are used as a bulking agent, such as a bulking agent in combination with at least one artificial or intense sweetener.

The novel inulin low molecular weight fractions of the invention, preferably at least about 75% by weight of inulin polysaccharides, have molecular weights at and below about 2288. (Unless otherwise indicated, all percentages as used herein are weight percentages determined on a dry weight basis.) The foregoing novel inulin fractions have improved water solubility and/or water miscibility at ambient temperatures, for example, temperatures from about 10° C. to about 25° C.

In one embodiment of the invention, the solubility of such low molecular weight fractions of inulin is at least about 5 grams per 100 ml. of water at temperatures at about 25° C. and below.

The sweetener composition solubility is ordinarily dictated by the solubility of the least soluble component. In the case of sweetener compositions containing inulin, their solubility will be dictated ordinarily by the solubility of the inulin, the least soluble component. Therefore, if the inulin fractions have the foregoing solubility, the sweetener composition containing the same ordinarily will have the same solubility also. So, thus, the sweetener compositions of the invention ordinarily will have solubilities in water of at least about 5 grams per 100 ml. of water at temperatures of about 25° C. and below.

The novel inulin products of the invention can be prepared from one or more of the many sources of inulin; for example, chicory root, Jerusalem artichoke, dahlia tubers, agave and the like (see Table 2 above). Although the following description will describe preparation of fractions derived from chicory root, it is understood that the process of the invention is applicable as well to other plants containing inulin.

Figure 1:
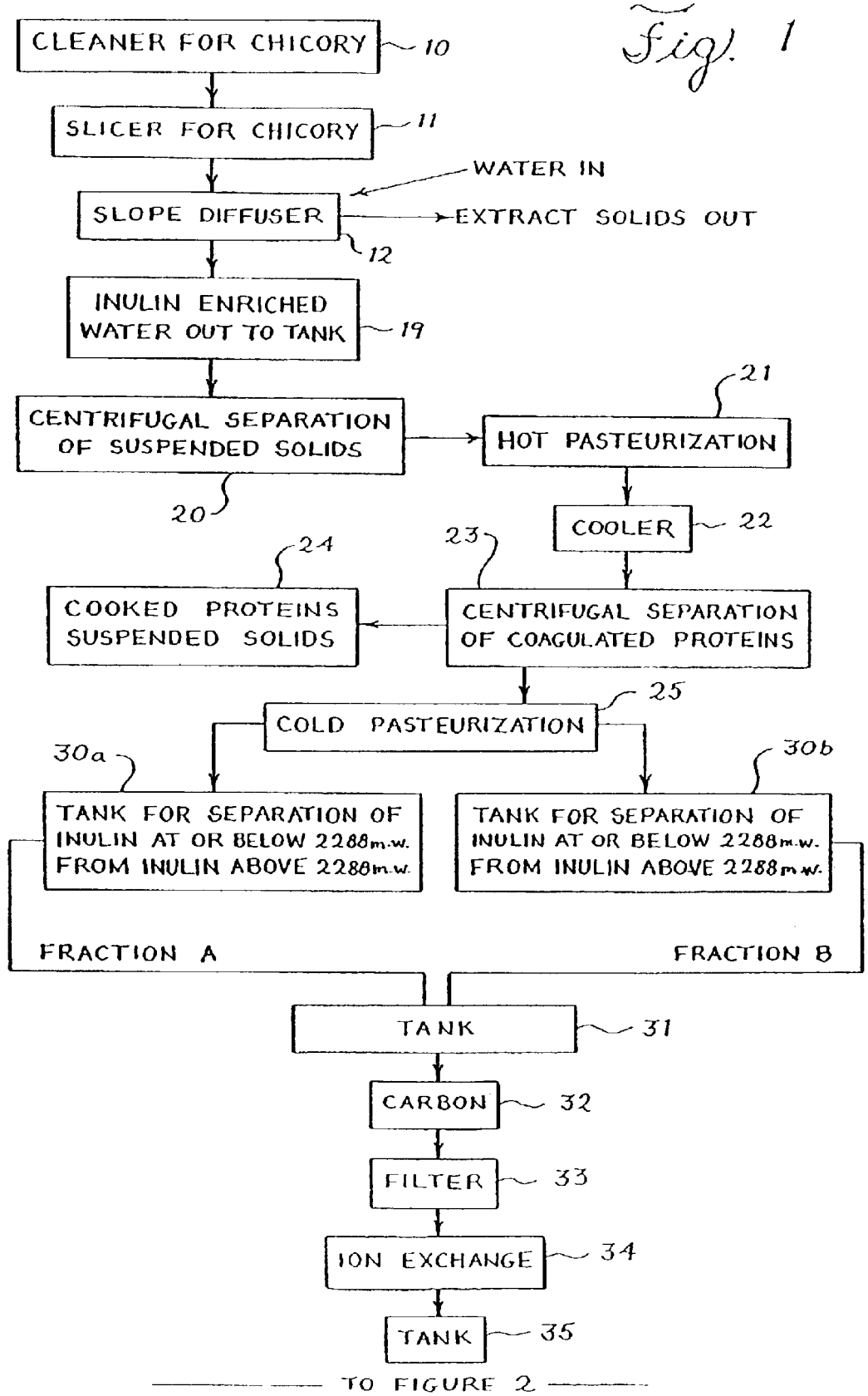
FIGS. 1 and 2 of the drawings contain a flow diagram illustrating a preferred process of the invention.

Referring to FIG. 1 of the drawings, the chicory roots are first cleaned at 10 and then subdivided at 11. The subdividing reduces the chicory to pieces preferably no thinner than about 0.24 centimeters thick. Various pieces of various apparatus may be used for chopping or cutting the chicory, as is well known in the art.

After subdividing, the chicory is introduced into an extractor, as shown at 12, preferably an extractor of the type shown in Silver U.S. Pat. No. 5,456,893. Other extraction systems may be used, for example, extraction by pressing.

After extraction, the inulin rich extraction liquid (water, or water base liquid) is collected in a surge tank 19 and continuously pumped to a clarifying type centrifugel 20 where particles, suspended soils, and solids are separated out as a waste or animal feed by-product.

The inulin enriched extraction liquid is then delivered to a pasteurization feed tank and system, and pasteurized at 21. The purpose of the pasteurization is to kill any bacteria present and to denature the enzymes in order to stop any further enzymatic activity. In the process of the present invention, it is preferable to heat the extraction to temperatures and pressures sufficiently high to coagulate the proteins so that they may be separated from the inulin by filtration or centrifugation. Any suitable pasteurization steps which accomplish the foregoing purposes are satisfactory, for example, heating to about 107° C. for five to nine minutes at elevated pressure, such as 103.4 cm of Hg.

The pasteurized inulin is preferably cooled immediately after pasteurization, as shown at 22, in order to minimize the thermal breakdown of inulin and thereby to increase the yield.

After pasteurization, the inulin rich liquid is clarified to remove coagulated proteins, as shown at 23. Any suitable clarifier, filter, or centrifugal separator may be used although it is preferred to use a centrifugal separator in order to maximize the yield of inulin. The cooked protein and suspended solids, as shown at 24, are removed from the inulin stream as by-products.

With the removal of most of the coagulated proteins at 23, the inulin rich liquid is next cold pasteurized 25 for the removal of spores and any bacteria not killed in the hot pasteurization process. A 1000 angstrom ultrafiltration filter is preferred for this purpose. The retentate, in part, should be circulated back through a filter, or the centrifugal separator 23, in order to remove materials over 1000 angstrom in size and prevent them from being fed back to the ultrafiltration filter 25.

One of the discoveries of this invention is that inulin rich liquid can be separated into two fractions: one, Fraction A, containing at least about 75% by weight polysaccharides with molecular weights of about 2288 and below; and a second, Fraction M, of inulin with molecular weights of above about 2288, preferably of, or above, about 2450 and above.

The permeate of the cold pasteurization process 25 is sent, in turns, to tank 30a, tank 30b, etc, or to centrifugal separators. Here, the inulin rich liquid is separated into the fractions A and M, each containing inulin of predominately different molecular weights. In accordance with the present invention, the inulin compounds are separated into two fractions, Fraction A with molecular weights up to and including about 2288, and Fraction M with inulin compounds having molecular weights above about 2288, or 2450. Referring to 30a and 30b, the separations may be performed by settling tanks, as described below.

The inulin rich water extraction medium is introduced into a first settling tank at 30a and held at temperatures at about ambient and below for settling out of some of the high molecular weight fractions of inulin. The temperatures are preferably less than 7° C., more preferably between about 0° C. and about 7° C. and most desirably between about 0° C. and 3° C., for a period of time to allow at least some of the higher molecular weight inulin to settle out, usually at least about 5 hours, preferably at least about 10 hours, and desirably at least about 20 hours, ordinarily, usually about 24–48 hours. After settling out of some of the high molecular weight inulin fractions, the liquid medium is decanted from the first settling tank 30a into another tank 31.

The liquid medium decanted from first tank 30a is inulin rich water containing at least about 75%, preferably at least about 80%, by weight of polysaccharides with molecular weights of 2288 and below, the low molecular weight inulin fraction.

It is a discovery of this present invention that Fraction A has highly desirable properties for food and for food blending as a bulking agent. Fraction A can be processed and refined as detailed hereafter.

The settled out Fraction M in the first settling tank 30a is first washed and then removed as a by-product. The washings of Fraction M usually contain the lower molecular weight polysaccharides and are also introduced into tank 31. Fraction M can be processed as will be described hereinafter.

Since the settling tanks usually require standing of the inulin for at least about 5 hours, preferably several such settling tanks are used as described above to perform identical functions in order to economize the settling time and increase production. As illustrated, 30b is another tank in parallel with 30a for performing the identical function. Other tanks (30c, 30d, etc., not shown), may be used in parallel with tanks 30a and 30b.

Although the separation described above is performed in settling tanks, it is also contemplated that separation be performed by centrifuges.

In the process of centrifugal separation, the inulin is much more quickly concentrated by high gravity forces 1500 to 15,000 times greater than the settling gravity of tanks 30a and 30b. Centrifugation thus has the benefit of shortening the process time and decreasing the opportunity for bacterial infection.

Furthermore, cooling centrifuges have been developed in which temperatures of the inulin rich water are controlled as Fraction A and Fraction M form in the centrifuge.

Liquid compositions of inulin, for example the inulin rich extraction liquid introduced into settling tank 30a, containing both high molecular weight fractions of inulin (at least about 75% by weight of inulin polysaccharides with molecular weights above about 2288) and low molecular weight fractions (at least about 75% by weight of inulin polysaccharides with molecular weights below about 2288) tend to form a thixotropic gelled phase when the amounts of water in the liquid composition are reduced to low levels, such as, when the combined solids content rises to above about 15% by weight. The thixotropic gelled phase reduces the settling out of the high molecular weight fraction.

The term thixotropic gelled phase, as used herein, refers to that characteristic of inulin containing high molecular weight inulin polysaccharides which appears as a thick viscous cream upon standing without agitation for about 60 days or less. The thixotropic gelled phase of inulin can be liquefied with agitation or shearing or upon heating to elevated temperatures.

The inulin rich liquid composition, therefore, preferably is supplied to, or contained in, the settling tanks 30*a* and 30*b*, or centrifuges, with sufficient water content to prevent formation of the thixotropic gelled phase, and preferably contains, therefore, sufficient amounts of water to maintain the solids content of the liquid composition below about 15% by weight. At the same time, the amount of combined high and low molecular weight inulin in the liquid solution preferably is sufficiently high, for example, above about 10% by weight of the water together with the water soluble solids, in order to promote settling out of the high molecular weight inulin fraction.

The preferred temperatures for settling out of the high molecular weight inulin are ambient temperatures and below, most preferably below ambient temperatures, desirably at about 7° C. and below, more desirably in the range from about 0° to about 7° C., and most desirably in the range from about 0° C. to about 3° C. for a period of time sufficient to allow at least some of the high molecular weight fractions to settle out. The lower temperatures are preferred because they inactivate bacteria and promote a more rapid settling out of the high molecular weight fraction.

The time for settling out depends upon various factors such as the temperature of the inulin rich liquid composition and the concentrations of the high and low inulin fractions. Usually, some settling out of the high molecular weight inulin occurs in the settling tanks upon standing without agitation anywhere from about 2 to 30 hours.

Fraction A decanted from the settling tanks or centrifuges can be treated to remove the bitter taste of chicory from the inulin enriched water. An activated carbon treatment, as shown in 32, works satisfactorily for this purpose. However, any technique can be used to remove the bitter flavor which does not destroy substantial amounts of the fragile polysaccharides.

A preferred method for removing color and unwanted flavors from Fraction A is to heat Fraction A to temperatures above ambient, for example, temperatures from about 33° C. to about 36° C., and to pump these heated fractions through a series of carbon columns until the unwanted flavors and/or colors disappear. The fractions can be further treated by passing through a series of mixed bed ion exchange columns to remove some potassium and iron.

An advantage of pumping only the liquid portion containing the low molecular weight inulin through the activated carbon is that this fraction does not readily plug up the activated or granular carbon pores or ion exchange columns which may follow. This reduces costs of production and increases the yield of inulin.

From tank 31, the inulin enriched supernatant water is introduced into the carbon columns 32 where color and the bitter flavor that are in the chicory are removed. Then, the supernatant may be passed through ion exchange columns 34. In the ion exchange columns, various trace elements are removed such as calcium, phosphorus, potassium and iron. This step is optional as it may be desirable to retain the minerals in the final product.

In between the carbon columns 32 and the ion exchange columns 34, a filter 33 is located to filter out any carbon fines that might be carried in the stream of inulin enriched supernatant and which would contaminate the resins of the ion exchange columns. A 5 micron mesh was found to be satisfactory for this filter although other sizes might be suitable. From these columns, the now purified inulin enriched supernatant comes out as a clear, translucent liquid at a concentration between about 5 percent and about 15 percent solids, which is then introduced into tank 35 (see bottom—FIG. 1, and top—FIG. 2).

Figure 2:
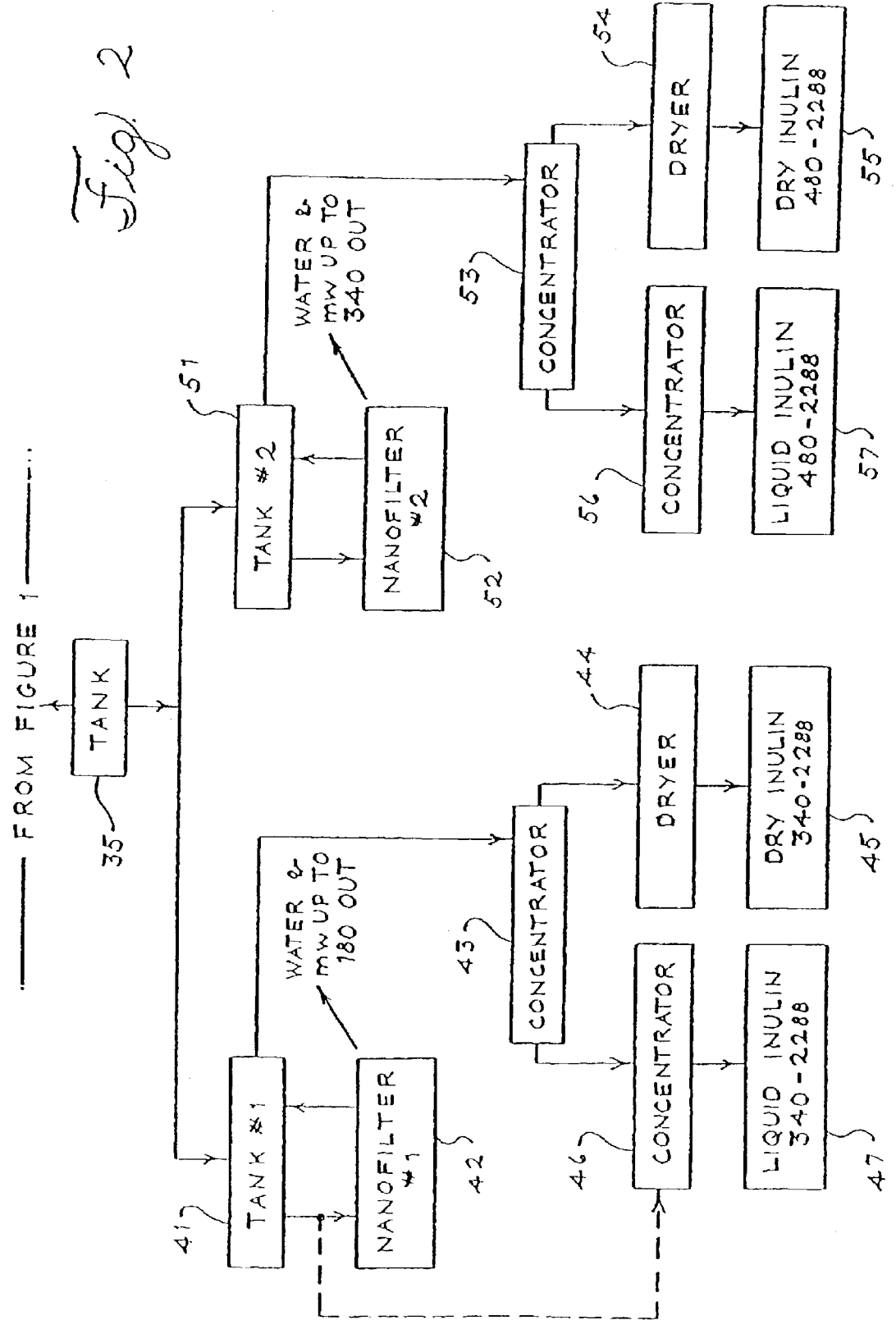

Referring to FIG. 2, from tank 35, the inulin enriched supernatant is pumped to tank No. 1, 41, to the full mark. Then nanofilter No. 1, 42, is put into operation.

From tank 41, the material goes through nanofilter No. 1, 42. This filter uses a membrane manufactured to remove the fructose and glucose from the inulin and enables the first separation of an inulin product whose molecular weight ranges predominantly from about 340 up to and including about 2288 molecular weight. The concentrate from this filter is fed to a concentrator 43 where it is concentrated to a consistency satisfactory to be fed to a dryer 44 (for example, a falling film evaporator, spray dryer or freeze dryer, such as are known in the art), where it can be dried into an inulin product substantially free of fructose and glucose (and other monosaccharides). The granulated or dried inulin may be stored in dry inulin bin 45. Preferably, the low molecular weight inulin fractions of the invention contain sufficiently low amounts of monosaccharides so that the hygroscopicity of such fractions is insignificant; for example, the monosaccharides are preferably less than about 1%, desirably less than 0.8%, and most desirably less than about 0.75% by weight of the fraction. The monosaccharides are hygroscopic and tend to cause the inulin fraction to cake and lump. Reduction of the amounts of monosaccharides reduces that undesirable property.

An alternate production stream may bypass the dryer 44 and go to a second concentrator 46 where it is concentrated to the desired solids to liquid ratio and then stored in liquid inulin tank 47. A desirable inulin product is an inulin rich syrup containing at least about 45%, preferably at least about 50%, and desirably at least about 55%, by weight of inulin solids of low molecular weight having at least about 75% by weight of inulin polysaccharides with molecular weights below about 2288.

A second stream coming from tank No. 2, 51, can be treated by being pumped to nanofilter No. 2, 52. In this filter, membranes are provided which remove the sucrose as well as the fructose and glucose and a concentrate is provided whose molecular weight ranges from 480 up to and including 2288. The concentrate from this filter is fed to a concentrator 53 where it is concentrated to a consistency satisfactory to be fed to a dryer 54 where it can be dried into an inulin fraction substantially free of fructose, glucose, and sucrose. The product is stored in dry inulin bin 55. An alternate production stream may bypass the dryer 54 and go to concentrator 56 where it is concentrated to the desired solids to liquid ratio and then stored in liquid tank 57 or bottled. The dry or liquid product comes out with inulin having a molecular weight predominantly between about 480 up to and including about 2288.

Another fraction of inulin can be taken from the tank 31 and sent through the carbon columns 32 and ion exchange 34 through tank 41 directly to concentrator 46 that will concentrate it up to the desired solids to liquids ratio to produce a finished liquid inulin that has a molecular weight up to and including about 2288. Each of these products of inulin can be used for specific applications in foods and food blending.

In place of the settling tanks, centrifuges can be used to separate the high molecular weight inulin that is above about 2288 from the low molecular weight inulin at or about 2288. Depending on the concentration and the number of Gs applied, there can be different fractions of inulin separated. This provides great flexibility in the ranges of molecular weight in most products.

The high molecular weight inulin, Fraction M described above, which is separated from the low molecular weight inulin can be used to prepare useful inulin products. These products also can be blended with other foods. The high molecular weight inulin has the mouth feel of and consistency of fats, especially butter and cocoa fats.

When the high molecular weight inulin fraction is used directly, the product is generally in a thixotropic gelled phase. This is the easiest form in which it can be blended with other foods. It can be concentrated into a thickened product by centrifugation. The resulting product is a very creamy gel. The high molecular weight inulin may also be concentrated in a falling film evaporator into a rich creamy syrup. Lastly, the high molecular weight inulin may be spray dried or freeze dried to produce a fine granular powder. This powder, when mixed with water at room temperatures or below, is highly insoluble and produces a hazy liquid composition.

In the process of producing the high molecular weight inulin fraction, Fraction M, the monosaccharides are reduced in amounts so that the hygroscopicity of such fractions is insignificant; for example, in amounts less than 1%, preferably less than about 0.8%, and desirably less than about 0.75% by weight. Reducing the amounts of monosaccharides not only reduces the hygroscopicity of the resulting product, but also increases the rate of spray drying. The amount of disaccharides in Fraction M are less than about 0.75%, and desirably less than about 0.5% by weight. The very low sugars content in Fraction M make this product very desirable for non-sugar diets.

Also, in the process of producing the high molecular weight inulin fraction, Fraction M, the bitter flavor which is in chicory juices, can be washed out of this fraction by one or several washes. This makes unnecessary a carbon treatment of the high molecular weight inulin fraction which is very advantageous since the high molecular weight inulin plugs up the activated carbon or granular carbon cylinders or retorts. The yield of high molecular weight inulin through this washing process is hereby greatly increased.

Briefly, a preferred process of the invention can be best illustrated by the following Examples:

EXAMPLE 1

A. Extraction

Chicory tubers were cleaned, cut in a Putsch Slicer to sizes no thinner than about 0.24 centimeters thick, and then introduced into a slope diffuser of the type shown in FIGS. 2 and 3 of U.S. Pat. No. 5,456,893.

Well water was used as the liquid extraction medium in the slope diffuser at a pH from 5.5 to 7.0. In the slope diffuser the water was heated to temperatures from 70° C.–80° C. at ambient pressures. The sliced chicory solids were introduced into the lower end of the slope diffuser and moved countercurrent to the flow of the heated water for extraction of inulin from the chicory. The dwell time of the chicory solids in the slope diffuser of U.S. Pat. No. 5,456,893 was from about 20 minutes to one (1) hour.

B. Pasteurization and Clarification

The inulin rich extraction water from the slope diffuser was collected in a vessel and then pumped to a pusher type clarifying centrifugal rotating at 3600 RPM. Suspended solid particles and pulp were removed in the centrifuge. The clarified inulin rich extraction water then flowed by gravity from the centrifuge to the pasteurizing tank, a steam jacketed round tank. In this tank, the clarified (pulp free) inulin rich extraction water was heated by 6.8 kg exhaust steam to between 91°–93° C. for about 15 minutes at ambient pressures, in order to kill the bacteria, coagulate the protein particles present, and denature the enzymes. From the pasteurizing tank, inulin rich water was pumped to a feed tank for feeding a filter to separate the coagulated proteins, insoluble particles, and bacteria from the inulin rich water.

The pasteurized inulin rich water was passed through 1000 angstrom ceramic filters in a U.S. Filter Membralox unit. This filtration removed bacteria and essentially all insoluble particles over 1000 angstrom size from the permeate. The filtered inulin rich water permeate was collected in a tank for further processing.

About two thirds of the concentrate in the Membralox filter circulated in the filter with about one third by volume bled off to the clarifying centrifuge which was placed ahead of the pasteurizer. In this manner, the solids content of the concentrate in the membralox filter was maintained at a reasonably low value and minimized plugging of the Membralox's filter elements.

C. Separation of Inulin into Different Molecular Weight Fractions

After cold pasteurization through a 1000 angstrom sized filter, the inulin juice is directed to a cooled holding column and cooled to a range of 1° C. to 5° C.

The inulin rich water extraction medium was separated into two fractions each containing inulin of predominantly different molecular weights.

In the holding column, the cooled heavier molecular weight inulin drops out of solution in what appears to be a colloidal form, which settles to the bottom of the column. The higher the RdS (refractometer dry substance) of the mother solution, the more rapidly the heavier molecular weight inulin forms into an apparent colloidal state. Also, more rapid cooling accelerates the formation of the heavier molecular weight inulin into what appears to be the colloidal state of suspended inulin.

With time (approximately twenty-four hours) and quiescent conditions (and with a solids content of at least about 5% (w/v), preferably at least about 10% (w/v), and desirably at least about 15% (w/v) (percent refers to grams of inulin per 100 milliliters of water), the suspended inulin settles to the bottom of the holding column. The supernatant liquid which is left may then be siphoned off the top, put through a carbon filter, concentrated and bottled, canned, or frozen as a bulking agent (i.e. a sucrose replacer) syrup, or further processed for drying.

The remaining colloidal-appearing inulin may then be pumped to a "washing column" or washed in place in the holding column with distilled, deionized, or ozonated water. In its simplest form, wash water is introduced in the bottom of the holding column through equally spaced non-clogging water distributors. The water has sufficient head behind it to feed the water up through the distributors evenly over the cross section of the holding and/or washing column. Because of the head of water behind it and because of the lower density of the introduced wash water, the wash water will rise uniformly up the column of precipitated inulin and wash the sugars and lighter molecular weight inulin towards the upper section of the holding column. The heavier molecular weight inulin will slowly sink toward the bottom of the column because of its greater weight, thus tending to segregate the inulin by molecular weight as the sinking heavier molecular weight inulin pushes the lower molecular weight inulin upward.

After one washing of precipitated inulin in a 1.8 meter wash column of 46 cm (7.6 liters) with 7.6 liters of deionized water, the results are as shown in Table 3. The water used for washing was at about 21° C. The column was left to stand for thirty hours at about 7° C.

TABLE 3

First Washing of Precipitated Inulin

| Product Name | Sample | Fructose/ Glucose Fraction 180 Mol. Wt. | Sucrose Fraction 340 Mol. Wt. | Light Weight Fraction | | Heavy Weight Fraction 2450 and Above Mol. Wt. |
| --- | --- | --- | --- | --- | --- | --- |
| | | | | 340-2288 Mol. Wt. | 480-2288 Mol. Wt. | |
| Wash | A | 3.95% | 1.15% | 51.14% | 49.99% | 44.91% |
| Pecipitate | B | 2.97% | 0.94% | 47.42% | 46.48% | 49.55% |

(all percentages are on a dry weight basis)

To increase the segregation of the inulin by molecular weight, second, third and even fourth washings may be used along with longer times allowed for segregation, lower temperatures of wash water (down to 0.6° C.), taller washing columns, and lower temperatures (down to 2° C.) of materials residing in the washing column between washings. After each washing, the supernatant which may contain some colored materials (but desirably not the colloidal inulin) is siphoned off, run through a carbon column if desired for decolorization, concentrated if desired, and packaged as a syrup for inulin's application as a bulking agent.

In the washing of the apparent colloidal inulin, as long as the washing water is kept between 2° C. and 7° C. and the wash column is kept between 2° C. and 7° C., very little of the apparent colloidal inulin is redissolved. There is a direct correlation between the solubility of colloidal inulin and temperature of the liquid surrounding it. There is also a reverse correlation between the concentration of inulin in the surrounding liquid and the solubility of the heavier molecular weight inulin therein. If the volume of washing water is limited to less than one volume per one volume of inulin colloid and temperatures throughout the process are kept low, little colloidal inulin is redissolved. If sufficient time is given, the washing water forms a transparent and sometimes dark supernatant above a clear-cut line below which is apparently an opaque white inulin colloid.

The supernatant is siphoned off after its clear formation following each washing and processed as required for color removal through the carbon column, and concentrated (by reverse osmosis or vacuum evaporation).

The precipitated suspended inulin is left in the column to concentrate as heavier molecular weight inulin settles to the bottom. This inulin may be siphoned out, drained out, or scooped out of the column depending on the consistency of the settled inulin.

In order to more clearly separate the heavier molecular weight inulin from the free fructose and glucose, and, if desired, also from the sucrose present in the supernatant, the supernatant is run through a filter, preferably a Synder (brand) special axial-flow nanofilter membrane having a nominal molecular weight cut-off of 300, mounted in a U.S. Filter housing. An example, sample C of the concentrate, is shown in Table 4. Sample D shows how the separation would be with a projected filter membrane having a nominal molecular weight cut-off of 400.

TABLE 4

Molecular Weight Characteristics of a Final Inulin Product

| Product Name | Sample ID | Fructose/ Glucose Fraction 180 Mol. Wt. | Sucrose 340 Mol. Wt. | Light Wt. Fraction | | Heavy Wt. Fraction 2450 and Above Mol. Wt. |
| --- | --- | --- | --- | --- | --- | --- |
| | | | | 340-2288 Mol. Wt. | 480-2288 Mol. Wt. | |
| Inulin Bulking Agent | C | 0.76% | Light Weight Fraction | 86.34% | | 12.83% |
| | D | 0.76% | 0.14% | | 86.20% | 12.83% |

(all percentages are on a dry weight basis)

Optionally, the concentrate may be passed through a chromatographic separation column for removal of much of the disaccharides.

EXAMPLE 2

The extraction is performed the same as in Example 1. The separation into different molecular weights also is performed as in Example 1, except that instead of decanting the supernatent liquid from the settling tanks, the precipitate and supernatent liquid are cooled, and while being cooled are introduced into a centrifuge, which is preferably cooled in the range from about 0° C. to about 7° C. The centrifuge is operated to separate the precipitate from the supernatent liquid. Otherwise, the steps of Example 2 follow the steps of Example 1.

The supernatant liquid obtained from Examples 1 and 2 contains novel fractions of inulin as more specifically defined below. The novel low molecular weight fractions of inulin may be maintained in the liquid, or the liquid with reduced amounts of water, and used in various applications, or the novel inulin fractions may be concentrated from the liquid into syrups or granular inulin by known techniques;

for example, by methods such as falling film evaporation, spray-drying, or freeze-drying.

Preferably, the combination of a falling film evaporation and spray drying is used to reduce fuel costs. In the combined drying process, the inulin rich supernatent liquid obtained from Examples 1 and 2 is first passed through a falling film evaporator to reduce the water contents to less than 70% by weight, preferably less than 60% by weight, and most desirably less than 50% by weight. After such removal of some water by the falling film evaporator, the inulin rich liquid preferably is then dried with a spray drier to a granular product.

The novel low molecular weight inulin fractions of the invention have improved solubility in water at ambient temperatures. The granular inulin fractions of the invention are soluble in water in amounts of at least about 5 grams per 100 milliliters of water ($\geq 0.05$ w/v), preferably at least about 10 grams per 100 ml of water ($\geq 0.1$ w/v), and desirably at least about 20 grams per 100 milliliters of water ($\geq 0.2\%$ w/v) at temperatures in the range from about 10° C. to about 25° C. As used herein, the phrase refers to capable of being dissolved in water.

As used herein, "granulated" and "granular" are meant to refer to solid particles, regardless of how they are prepared, how they are formed, or how fine they are in size. The terms "granulated" and "granular" are intended to include powder. As used herein, the term "miscible", means the capability of inulin to mix with water above the point of being dissolved in water.

It has been observed that the granular inulin products of the invention when mixed with water in amounts above, for example, about 40 gms/100 ml at 22° C., exhibit a haze appearance which is characterized herein as one example of water miscibility. The haze becomes more opaque as more of the inulin fraction is added to the water.

The novel low molecular weight fractions of inulin produced by the process herein described comprise polysaccharides having molecular weights in the range from about 2288 and below and which contain less than 25% by weight of polysaccharides with molecular weights above about 2288. Such low molecular weight polysaccharides are water soluble at ambient temperatures, for example, at about 25° C. and below. Accordingly, the novel inulin fractions of the invention are especially useful in admixture with other foods, especially other water soluble foods, or in admixture with water soluble artificial sweeteners including the sugar alcohols and the intense sweeteners.

The mixture of granulated water soluble inulin fractions and granulated water soluble artificial and/or intense sweeteners is an ideal sucrose substitute. As water soluble sucrose substitutes, such mixtures may be used as a replacement for sucrose as a table sweetener; in liquids, such as soft drinks, various fruit drinks, coffee and tea, and in confections, such as candy and chewing gum, as well as in baking and cooking.

By artificial sweeteners is meant any sweetening agent, whether synthetic compounds or those derived from naturally occurring substances, for example, derived from plant components, that can be safely ingested by humans, other than sucrose, glucose, fructose and lactose. Examples of artificial sweeteners as defined herein include aspartane, saccharin, sucralose ("Splenda"™), acesulfame potassium ("Sunett"™), neotame, xylitol, erythritol, sorbitol, mannitol, maltose and maltitol. Combinations of the foregoing artificial sweeteners may be used singly, or admixed, and combined with the low molecular weight inulin fractions of the present invention. The term artificial sweetener is meant to include the sugar alcohols and the intense sweeteners.

The term sugar alcohols is used to refer to xylitol, erythritol, sorbitol, mannitol, maltitol and maltose.

The term intense sweeteners is used to refer to aspartame, saccharin, sucralose ("Splenda"™), acesulfame K, neotame, as well as others known in the field, but which may or may not be approved for use in the United States at present.

The intense sweeteners are many times sweeter than sucrose. The inulin fractions of the invention may be combined with such sweeteners in high ratios, for example, as high as 25:1, 100:1, 200:1, 600:1 or 8000:1 times the weight amount of inulin to the weight amount of the sweeteners depending on the intense sweetener or mixtures of sweeteners employed. At such high amounts of inulin, the water solubility of the inulin fractions is important; insoluble fractions of inulin are undesirable for many applications.

In some instances, one or more of the naturally occurring substances, such as sucrose, glucose, fructose or lactose may be mixed with one or more artificial sweeteners, and the mixture combined with the low molecular weight inulin fractions of the invention. Such combinations may reduce the caloric content, and, at the same time, the sweetener composition would benefit from the presence of the low molecular weight inulin fraction.

As explained earlier, the monosaccharides impart the undesirable property of hygroscopicity. For that reason, the monosaccharides present in the sweetener compositions preferably are reduced in amounts to a point below which the hygroscopicity of the sweetener compositions is insignificant compared to raw inulin. For example, the monosaccharides may be present in amounts less than about 1%, preferably less than about 0.8%, and most desirably less than about 0.75% by weight of the sweetener composition.

The benefits of the invention described herein are many. The low molecular weight inulin fractions enhance the organoleptic properties of sweeteners. The sweeteners seem more sweet in the presence of such inulin fractions. When dissolved in water, the low molecular weight inulin fractions in the sweetener compositions are more easily dissolved and have a reduced tendency to form insoluble materials which settle out. The novel low molecular weight inulin fractions of the invention make ideal bulking agents for admixture with artificial and intense sweeteners.

Due to the fact that the novel products of inulin in granular form with reduced amounts of monosaccharides have a reduced hygroscopicity, the sweetener compositions have a reduced tendency to cake or lump upon storage. The freedom from caking or lumping is important, especially in sweetener compositions in which the instant solubility in water solutions is highly desirable.

The low molecular weight fractions of inulin have improved mouth feel, and do not form undesirable sticky substances in the mouth, the latter of which is a characteristic of some other inulin products.

When mixed with water, the low molecular weight fractions of inulin have a reduced tendency to form sticky clumps or lumps. The inulin products of the invention also have a reduced tendency to settle out of the water upon standing.

In one embodiment, sweetener composition contains polysaccharides having molecular weights in the range from about 480 to about 2288, which substantially eliminates sucrose; for example, disaccharides (such as sucrose) are less than 2%, and preferably less than 1% by weight. This specific fraction has particular applicability for the health conscience public. There is an increased interest in eliminating sucrose from the diet due to the increase in obesity among our population. Moreover, the diabetic population necessarily needs to eliminate sucrose from its diet. Accordingly, this specific novel inulin product has particular benefits in meeting the desires and needs of our health conscience population.

Other embodiments of the invention are table sugars or small packets containing at least one artificial and/or intense sweetener in amounts equal in sweetness to one-half, one, two, or more teaspoons of sucrose, together with the low molecular weight inulin fraction of the invention.

The process of the invention has many benefits. In particular, the process can be carried out without excessive costs. The process also is less expensive than the procedures heretofore used commercially and gives a more consistent product. The novel fractions of inulin of the invention are heat stable and thereby useful in baked goods. The artificial sweetener sucralose is also heat stable; therefore, the admixture of sucralose and the novel fractions of the invention can be used in place of sucrose in cooking and baking.

Many further advantages and benefits of the invention will be apparent to those skilled in the field. In addition, there are many modifications and variations that can be made to the product and process as will be apparent to those skilled in the field without varying from the spirit and scope of the invention.

It is therefore intended that the foregoing detailed description be regarded as illustrative rather than limiting, and that it be understood that it is the following claims, including all equivalents, that are intended to define the spirit and scope of this invention.

What is claimed is:

1. Granulated sweetener compositions comprising:
    at least one granulated artificial sweetener, and
    granulated fractions of inulin,
    said granulated fractions of inulin comprising at least two different polysaccharides extracted from plant materials containing inulin,
    said granulated fractions of inulin having a water solubility of at least about 5 grams per 100 ml. of water at temperatures of about 25° C., and below.

2. The granulated sweetener compositions of claim 1 which contain less than about 25% by weight of polysaccharides with molecular weights above about 2288.

3. The granulated sweetener compositions of claim 1 in which the sweetener comprises at least one sugar alcohol.

4. The granulated sweetener compositions of claim 1 in which the sweetener comprises one or more sugar alcohols selected from the group consisting of xylitol, erythritol, sorbitol, mannitol and maltitol.

5. Granulated sweetener compositions comprising:
    at least one granulated intense sweetener, and
    granulated fractions of inulin,
    said granulated fractions of inulin comprising at least two different polysaccharides extracted from plan materials containing inulin;
    said granulated fractions of inulin having a water solubility of at least about 5 grams per 100 ml. of water at temperatures ranging from about 25° C., and below.

6. The granulated sweetener compositions of claims 1 or 5 in which the sweetener comprises granulated aspartane.

7. The granulated sweetener compositions of claims 1 or 5 in which the sweetener comprises granulated sucrolose.

8. The granulated sweetener compositions of claims 1 or 5 in which the sweetener comprises granulated saccharin.

9. The granulated sweetener compositions of claims 1 or 5 in which the sweetener comprises granulated neotame.

10. The granulated sweetener compositions of claims 1 or 5 in which the sweetener comprises granulated acesulfame-K.

11. The granulated sweetener compositions of claims 1 or 5 in which the granulated fractions of inulin comprise at least three different polysaccharides.

12. The granulated sweetener compositions of claims 1 or 5 in which the granulated fractions of inulin comprise at least four different polysaccharides.

13. The granulated sweetener compositions of claims 1 or 5 in which the amount by weight of monosaccharides is sufficiently small so that the hygroscopicity of the sweetener compositions is insignificant.

14. The granulated sweetener compositions of claims 1 or 5 in which said inulin fractions contains less than about 2% by weight of disaccharides.

15. Granulated sweetener compositions comprising:
    at least one granulated intense sweetener, and
    granulated fractions of inulin,
    said granulated fractions of inulin comprising at least two different polysaccharides extracted from plant materials containing inulin;
    said granulated fractions of inulin having a water solubility of at least 5 grams per 100 ml. of water at temperatures of about 25° C., and below; and
    said granulated fractions of inulin containing less than about 2% by weight of disaccharides.

16. The granulated sweetener compositions of claim 15 in which the granulated fractions of inulin comprise at least three different polysaccharides.

17. The granulated sweetener compositions of claim 15 in which the granulated fractions of inulin comprise at least four different polysaccharides.

18. The granulated sweetener compositions of claims 15, 16 or 17, in which the sweetener comprises granulated aspartane.

19. The granulated sweetener compositions of claims 15, 16 or 17 in which the sweetener comprises granulated sucrolose.

20. The granulated sweetener compositions of claims 15, 16 or 17 in which the sweetener comprises granulated saccharin.

21. The granulated sweetener compositions of claims 15, 16 or 17 in which the sweetener comprises granulated neotame.

22. The granulated sweetener compositions of claims 15, 16 or 17 in which the sweetener comprises granulated acesulfame-K.

* * * * *